United States Patent
Mahankali

(10) Patent No.: US 12,116,898 B2
(45) Date of Patent: Oct. 15, 2024

(54) RAM AIR DRIVEN BLADE TIP CLEARANCE CONTROL SYSTEM FOR TURBOPROP ENGINES

(71) Applicant: Pratt & Whitney Canada Corp., Longueuil (CA)

(72) Inventor: Venkata Sai Prahasith Mahankali, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/160,117

(22) Filed: Jan. 26, 2023

(65) Prior Publication Data
US 2024/0254890 A1     Aug. 1, 2024

(51) Int. Cl.
 *F01D 11/24*  (2006.01)
 *F01D 11/18*  (2006.01)

(52) U.S. Cl.
 CPC .............. *F01D 11/24* (2013.01); *F01D 11/18* (2013.01); *F05D 2220/323* (2013.01); *F05D 2240/11* (2013.01); *F05D 2240/55* (2013.01); *F05D 2260/201* (2013.01)

(58) Field of Classification Search
 CPC .. F01D 11/23; F01D 11/18; F02C 7/04; F02C 6/206; Y10T 137/0536; F05D 2220/323; F05D 2220/324; F05D 2240/11; F05D 2240/55; F05D 2260/201; F05D 2260/22141
 See application file for complete search history.

(56) References Cited

U.S. PATENT DOCUMENTS

| | | | | |
|---|---|---|---|---|
| 2,464,724 A | * | 3/1949 | Sedille | F02C 6/206 60/762 |
| 4,060,981 A | * | 12/1977 | Hampton | F02K 3/075 415/167.1 |
| 4,472,108 A | | 9/1984 | Pask | |
| 4,569,199 A | * | 2/1986 | Klees | F02K 3/075 60/773 |
| 4,841,726 A | | 6/1989 | Burkhardt | |
| 4,892,269 A | * | 1/1990 | Greco | F02C 6/206 244/65 |

(Continued)

OTHER PUBLICATIONS

Extended European Search Report for EP Application No. 24154264.6, dated May 17, 2024, pp. 1-6.

*Primary Examiner* — Juan G Flores
*Assistant Examiner* — Ryan C Clark
(74) *Attorney, Agent, or Firm* — CANTOR COLBURN LLP

(57) ABSTRACT

Turboprop engines include a housing, a propeller arranged at a forward end of the housing, and a rotor assembly arranged within the housing, the rotor assembly comprising at least one rotor having a plurality of rotor blades. A blade shroud is arranged radially outward from the rotor assembly and positioned relative to the rotor blades such that a tip clearance is defined between tips of the rotor blades and an inner diameter surface of the blade shroud. A shroud cooling duct is defined radially outward from the blade shroud and radially inward from the housing and an air scoop is configured to direct a shroud cooling flow into the shroud cooling duct to pick up heat from the blade shroud and provide cooling thereto.

18 Claims, 6 Drawing Sheets

(56) References Cited

U.S. PATENT DOCUMENTS

| | | | | |
|---|---|---|---|---|
| 4,930,725 | A * | 6/1990 | Thompson | F02C 6/206 244/65 |
| 5,987,877 | A * | 11/1999 | Steiner | F02C 7/14 60/39.83 |
| 6,282,881 | B1 * | 9/2001 | Beutin | F02C 7/14 60/226.3 |
| 8,834,108 | B2 | 9/2014 | Negulescu et al. | |
| 9,957,889 | B2 * | 5/2018 | Labrecque | F02C 7/042 |
| 10,054,050 | B2 * | 8/2018 | Labrecque | F02C 7/05 |
| 10,174,665 | B2 * | 1/2019 | Thomassin | F01P 11/10 |
| 10,267,191 | B2 * | 4/2019 | Julien | B64D 27/02 |
| 10,385,785 | B2 * | 8/2019 | MacFarlane | F01D 9/045 |
| 11,719,248 | B2 * | 8/2023 | Dionne | B64D 33/08 123/41.66 |
| 2005/0229605 | A1 * | 10/2005 | Bouchard | F02C 7/04 137/15.1 |
| 2010/0290889 | A1 * | 11/2010 | Fedor | F01D 25/12 415/47 |
| 2013/0183149 | A1 * | 7/2013 | Weidmann | F01D 11/18 415/208.1 |
| 2016/0003086 | A1 * | 1/2016 | Day | F01D 11/24 415/136 |
| 2016/0160757 | A1 * | 6/2016 | Todorovic | F02C 7/04 415/115 |
| 2016/0251981 | A1 | 9/2016 | Hashimoto | |
| 2017/0021937 | A1 * | 1/2017 | Bustillo | B64D 33/10 |
| 2017/0130602 | A1 * | 5/2017 | Schelfaut | F01D 11/24 |
| 2017/0175769 | A1 * | 6/2017 | Sun | F04D 29/164 |
| 2018/0030987 | A1 * | 2/2018 | Clarke | F04D 29/164 |
| 2018/0141670 | A1 * | 5/2018 | Keller | B64D 33/08 |
| 2018/0172012 | A1 * | 6/2018 | Plante | F01D 9/02 |
| 2019/0136713 | A1 * | 5/2019 | Hussain | F01D 25/14 |
| 2019/0145315 | A1 * | 5/2019 | Dow | F01D 11/24 251/305 |
| 2019/0170009 | A1 * | 6/2019 | Sen | F01D 25/08 |
| 2019/0360400 | A1 * | 11/2019 | Elliott | F02C 7/04 |
| 2020/0102887 | A1 * | 4/2020 | Dinu | F01D 9/065 |
| 2021/0087971 | A1 * | 3/2021 | Emmanouil | F02C 7/04 |
| 2021/0108597 | A1 * | 4/2021 | Ostdiek | B64D 27/10 |
| 2021/0189960 | A1 * | 6/2021 | Speer | F02C 7/042 |
| 2022/0252008 | A1 * | 8/2022 | Sibbach | F02C 6/00 |

* cited by examiner

RAM AIR DRIVEN BLADE TIP CLEARANCE CONTROL SYSTEM FOR TURBOPROP ENGINES

BACKGROUND

The subject matter disclosed herein generally relates to turboprop engines and, more particularly, to blade tip clearance control systems.

In turbomachinery, such a turboprop engines, compressors and turbines are rotationally driven to drive a shaft to generate thrust. The compressors and turbines are arranged along one or more shafts that operably couple to the fan and to each other. The engines are typically enclosed, at least with respect to the compressors and turbines, to ensure desired flow characteristics of gases through the engine. For example, ambient air is brought into the engine, compressed in a compressor section, mixed with a fuel and combusted within a combustor, and then expanded through turbines that drive rotation of the shaft(s). The compressors and turbines are arranged as one or more disks having blades on edges thereof. The blades of the compressor and turbines are arranged to have minimum tip clearance between the tips of the blades and the housing of the engine to minimize loses while maintaining freedom to rotate without contact with the housing.

For example, having excessive tip clearance may cause performance loss due to tip leakage. Some engine applications may employ active tip clearance control by cooling an outer shroud (e.g., housing) to shrink the housing and to reduce the gap between the blade tip and the shroud. Active tip clearance may require various components, control systems, and ancillary and support systems to ensure that a desired tip clearance is maintained throughout operation of the engine. Improved tip clearance mechanisms may improve engine performance.

SUMMARY

According to some embodiments, turboprop engines are provided. The turboprop engines include a housing, a propeller arranged at a forward end of the housing, a rotor assembly arranged within the housing, the rotor assembly comprising at least one rotor having a plurality of rotor blades, a blade shroud arranged radially outward from the rotor assembly and positioned relative to the rotor blades such that a tip clearance is defined between tips of the rotor blades and an inner diameter surface of the blade shroud, a shroud cooling duct defined radially outward from the blade shroud and radially inward from the housing, and an air scoop configured to direct a shroud cooling flow into the shroud cooling duct to pick up heat from the blade shroud and provide cooling thereto.

In addition to one or more of the features described herein, or as an alternative, further embodiments of the turboprop engine may include a compressor section, a combustor section, a turbine section, and a shaft, wherein the compressor section, the combustor section, and the turbine section are arranged axially along the shaft.

In addition to one or more of the features described herein, or as an alternative, further embodiments of the turboprop engine may include that the air scoop is configured to direct a first portion of air from the propeller to the compressor and a second portion of air from the propeller into the shroud cooling duct.

In addition to one or more of the features described herein, or as an alternative, further embodiments of the turboprop engine may include an air inlet scoop configured to direct a first portion of air from the propeller to the compressor and the air scoop is configured to direct a second portion of air from the propeller to the shroud cooling duct.

In addition to one or more of the features described herein, or as an alternative, further embodiments of the turboprop engine may include that the air scoop is defined by two separate inlets arranged separate from the air inlet scoop.

In addition to one or more of the features described herein, or as an alternative, further embodiments of the turboprop engine may include that the blade shroud comprises at least one thermal transfer feature arranged on an outer diameter surface thereof, wherein the at least one thermal transfer feature increases a surface area of the blade shroud exposed to the shroud cooling flow with the shroud cooling duct.

In addition to one or more of the features described herein, or as an alternative, further embodiments of the turboprop engine may include that the at least one thermal transfer feature comprises a fin.

In addition to one or more of the features described herein, or as an alternative, further embodiments of the turboprop engine may include a vane assembly arranged axially adjacent the rotor assembly, wherein the vane assembly comprises a vane platform arranged adjacent the blade shroud.

In addition to one or more of the features described herein, or as an alternative, further embodiments of the turboprop engine may include an insulating feature arranged between the vane platform and the blade shroud.

In addition to one or more of the features described herein, or as an alternative, further embodiments of the turboprop engine may include that the insulating feature is an air gap.

In addition to one or more of the features described herein, or as an alternative, further embodiments of the turboprop engine may include that the insulating feature is a seal.

In addition to one or more of the features described herein, or as an alternative, further embodiments of the turboprop engine may include that the insulating feature is formed from a low heat transfer material.

In addition to one or more of the features described herein, or as an alternative, further embodiments of the turboprop engine may include a platform insulating feature arranged on a surface of the vane platform exposed to the cooling duct.

In addition to one or more of the features described herein, or as an alternative, further embodiments of the turboprop engine may include a flow control assembly configured to control a flow of the shroud cooling flow through the shroud cooling duct.

In addition to one or more of the features described herein, or as an alternative, further embodiments of the turboprop engine may include a controller configured to control operation of the flow control assembly in response to a measurement of the tip clearance and maintain the tip clearance at or below a maximum tip clearance size.

In addition to one or more of the features described herein, or as an alternative, further embodiments of the turboprop engine may include at least one sensor configured to monitor the tip clearance, the controller configured to receive data obtained by the at least one sensor.

In addition to one or more of the features described herein, or as an alternative, further embodiments of the turboprop engine may include that the at least one sensor comprises at least one of a temperature sensor and a tip clearance sensor.

In addition to one or more of the features described herein, or as an alternative, further embodiments of the turboprop engine may include that the flow control assembly is at least one of a movable baffle, a gate valve, and a controllable or movable vane.

In addition to one or more of the features described herein, or as an alternative, further embodiments of the turboprop engine may include that the rotor assembly is a rotor assembly of a turbine section of the turboprop engine.

In addition to one or more of the features described herein, or as an alternative, further embodiments of the turboprop engine may include that the rotor assembly is a rotor assembly of a compressor section of the turboprop engine.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
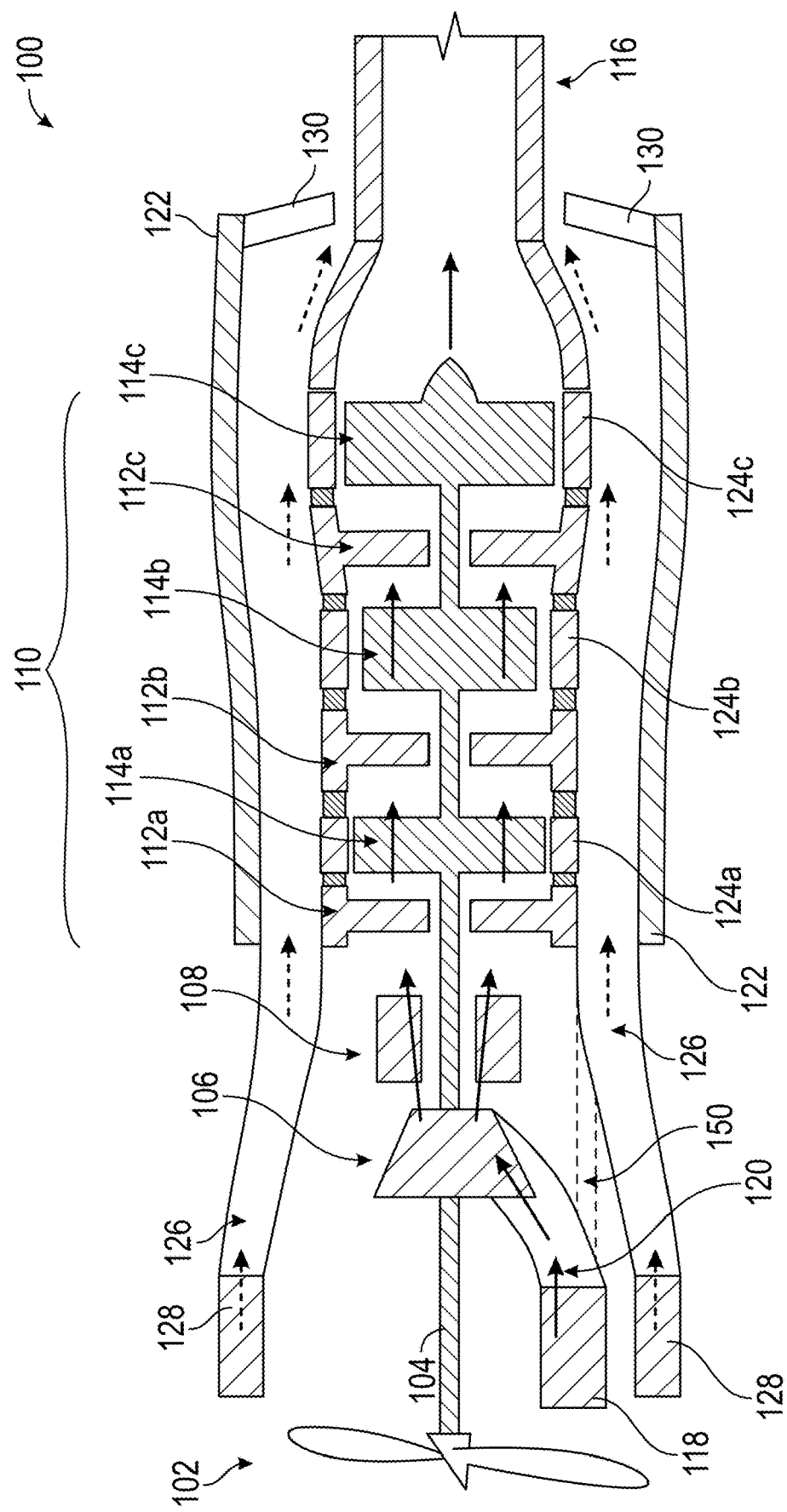
FIG. 1 is a schematic diagram of a turboprop engine in accordance with an embodiment of the present disclosure.

Referring to FIG. 1, a schematic diagram of a turboprop engine 100 in accordance with an embodiment of the present disclosure is shown. The turboprop engine 100 is configured to generate thrust for flight propulsion for aircraft. The turboprop engine 100 includes a propeller 102 arranged on a shaft 104. The shaft 104 is rotationally driven to drive rotation of the propeller 102 to generate a flow of air that is passed through the turboprop engine 100 for the purpose of generating combustion and exhaust and rotation of the propeller 102 to generate thrust and propulsion.

The turboprop engine 100 includes a compressor section 106, a combustion section 108, and a turbine section 110. Although shown with a single compressor element in the compressor section 106, this is merely for illustrative purposes and other configurations having multiple compressor elements in the compressor section 106 may be employed with embodiments of the present disclosure. Similarly, the arrangement and number of elements of the combustor section 108 are illustrative and not intended to be limiting to the specific arrangement as shown. The turbine section 110, of this illustrative and non-limiting embodiment, includes a set of vanes 112a-c and a set of turbine rotors 114a-c. The vanes 112a-c are arranged to direct combustion gases output from the combustion section 108 toward the respective turbine rotors 114a-c in order to cause rotation of the turbine rotors 114a-c. The turbine rotors 114a-c are coupled to the shaft 104 and rotationally drive the shaft 104 as the combustion gases are expanded through the turbine section 110. The expanded combustion gases are then expelled through an exhaust nozzle 116 of the turboprop engine 100.

The turboprop engine 100 is configured with an air inlet scoop 118 arranged downstream from the propeller 102 and configured to direct a portion of air from the propeller 102 to the compressor section 106, so that the air may be compressed and then directed to the combustion section 108. The air inlet scoop 118 may be fluidly coupled to the compressor section 108 by a primary duct 120. The components of the turboprop engine 100 are housed within an engine housing 122 (e.g., nacelle), which may extend the length of the turboprop engine 100 to house the components thereof.

The turbine rotors 114a-c each include sets of turbine blades that are rotated by the combustion gasses expanding through the turbine section 110. Arranged radially outward from the turbine rotors 114a-c, and the blades thereof, are respective turbine shrouds 124a-c. The turbine shrouds 124a-c are arranged to provide a surface along which the tips of the turbine blades may pass. The turbine shrouds 124a-c are arranged such that the tips of the blades contact or nearly contact the surface of the turbine shrouds 124a-c and provide a sealing surface to prevent leakage of the combustion gases from passing between the tips of the blades and the turbine shrouds 124a-c. Due to thermal expansion and contraction, and other operational considerations, the turbine shrouds 124a-c may need to be movable (e.g., radially) to accommodate changes in the radial position of the tips of the respective blades of the turbine rotors 114a-c.

In accordance with embodiments of the present disclosure, the turboprop engine 100 is provided with adjustable turbine shrouds 124a-c that may be adjusted in radial position relative to the tips of blades of the turbine rotors 114a-c. To provide such radial positional control, the turboprop engine 100 includes one or more shroud cooling ducts 126. The shroud cooling ducts 126 may be arranged radially outward from an outer diameter of the turbine shrouds 124a-c and radially inward from an inner diameter surface of the engine housing 122. The shroud cooling ducts 126 may be sourced with cooling air from one or more ram air scoops 128. The ram air scoops 128 may be arranged just aft of the propeller 102 and thus receive ambient air driven aftward by the propeller 102. A cooling flow of air will then flow through the shroud cooling ducts 126 and provide cooling to the turbine shrouds 124a-c.

At an aft end of the shroud cooling ducts 126, which is proximate the exhaust nozzle 116 of the turboprop engine 100, the flow through the shroud cooling ducts 126 may be expelled out the aft end of the turboprop engine 100. At the aft end, in this illustrative configuration, the shroud cooling ducts 126 may include one or more flow control assemblies 130. The flow control assemblies 130 may be baffles, gate valves, or other types of adjustable openings that may be controlled to regulate flow through the shroud cooling ducts 126. Although shown at the aft end of the shroud cooling ducts 126, the flow control assemblies 130 may be arranged at any axial position along the shroud cooling ducts 126, including at the inlet, along the length of the shroud cooling ducts 126, or at the outlet (as shown). Further, in some embodiments, multiple flow control assemblies may be arranged along the axial length of the shroud cooling ducts 126.

In accordance with embodiments of the present disclosure, cold air (e.g., ambient air) from the ram air scoops 128 located behind the propeller 102 is directed into the shroud cooling ducts 126. This stream of cold air is used to cool the turbine shrouds 124a-c. By cooling the turbine shrouds 124a-c the radial position and/or size of the turbine shrouds 124a-c may be reduced (e.g., shrink inner diameter of the turbine shrouds 124a-c), thus tip clearance between the turbine shrouds 124a-c and the tips of the blades of the turbine rotors 114a-c. This configuration allows the use of Ram air instead of compressor air, thus resulting in minimal performance loss at the engine level. In accordance with some embodiments of the present disclosure, the number or size of the ram air scoops 128 can ensure the appropriate amount of cooling while minimizing impacts to engine performance. For example, by adding additional scoops and/or increasing the scoop size, the thrust from the propeller may be reduced. However, even with such thrust reduction at the propeller, the gain in performance achieved at the engine level may more than compensate for this negative impact on thrust. For example, there are lower performance penalties from using ram air when compared to compressor air. This is because, as compared to using compressor air, no work has been put in to pressurize the air from the ram air scoops 128. That is, pressurization does not improve heat transfer on the shrouds with the same mass flow rate and thus using compressed or pressurized air does not improve the thermal operation applied to the shrouds. Additionally, the Ram air may be far colder than compressor air, thus a lower mass flow rate is required to achieve the necessary cooling on the shroud.

Although FIG. 1 is illustratively shown with a configuration of turbine shrouds 124a-c arranged relative to blades of turbine rotors 114a-c, this configuration is not to be limiting. In other embodiments in accordance with the present disclosure, a compressor section of a turboprop engine may include one or more sets of vanes arranged relative to compressor rotors. Blades of the compressor rotors may be arranged relative to respective compressor shrouds (e.g., similar to the turbine configuration shown in FIG. 1). Such compressor shrouds may have outer diameter surfaces that are arranged in thermal communication with a cooling air flow within shroud cooling ducts. In some embodiments, shrouds of both a compressor section and a turbine section may be arranged to be cooled by flow through shroud cooling ducts. As such, the present disclosure is not intended to be limited to turbine configurations only. Rather, any rotor assembly, such as a rotor assembly for a turbine section or a rotor assembly for a compressor section of a turboprop engine, may employ embodiments of the present disclosure.

Figure 2:
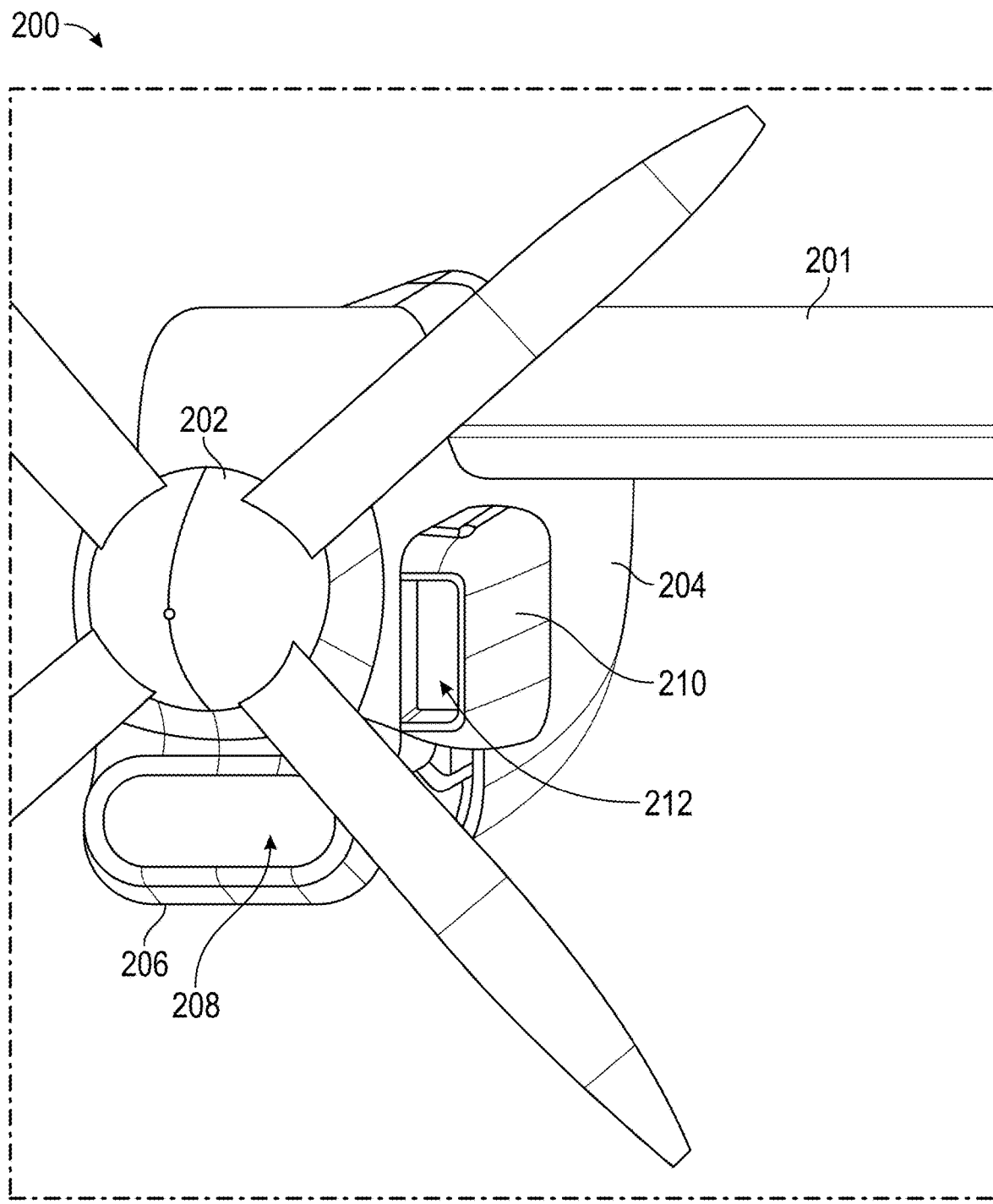
FIG. 2 is a schematic illustration of a turboprop engine in accordance with an embodiment of the present disclosure.

Referring now to FIG. 2, a schematic illustration of a turboprop engine 200 in accordance with an embodiment of the present disclosure is shown. The turboprop engine 200 is configured to generate thrust for flight propulsion for aircraft. The turboprop engine 200 includes a propeller 202 arranged on a shaft that is rotationally driven by components housed within a housing 204 (e.g., compressor section, combustion section, turbine section, etc.). The shaft is rotationally driven to drive rotation of the propeller 202 to generate a flow of air that is passed through the turboprop engine 200 for the purpose of generating combustion and exhaust and rotation of the propeller 202 to generate thrust and propulsion. As shown, the turboprop engine 200 may be wing-mounted on a wing 201 of an aircraft.

The propeller 202 is configured to drive air into one or more inlets or scoops arranged on the exterior of the housing 204. For example, an air inlet scoop 206 may be arranged to receive air forced into an inlet 208 of the air inlet scoop 206 from the propeller 204 and direct such air to a compressor and then downstream for combustion and driving rotation of a turbine of the turboprop engine 200. The air inlet scoop 206 may be similar to the air inlet scoop 118 shown and described with respect to FIG. 1. Also shown in FIG. 2 is a ram air scoop 210 having a respective inlet 212 configured to receive a portion of the air directed aftward by the propeller 202. The ram air scoop 210 may be similar to the ram air scoop(s) 128 shown and described with respect to FIG. 1. The inlet 212 of the ram air scoop 210 may be fluidly connected to a shroud cooling duct. The shroud cooling duct may be arranged such that the air passing through the shroud cooling duct will thermally interact with blade shrouds (e.g., turbine blade shrouds) to cool the shrouds and control a radial position of the shrouds to optimize tip clearance between the shrouds and the respective blades.

Figure 3:
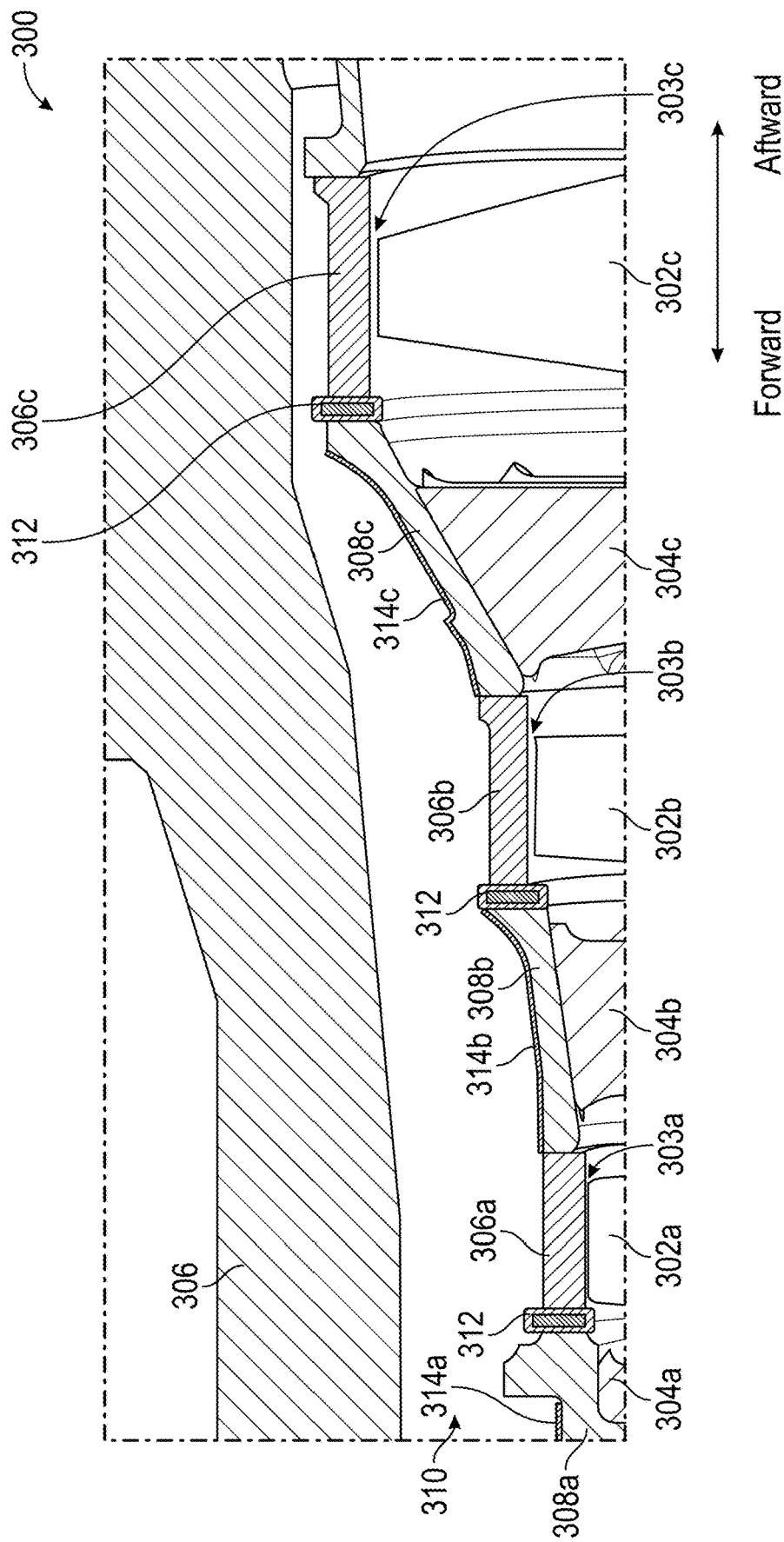
FIG. 3 is a schematic illustration of a portion of a turboprop engine in accordance with an embodiment of the present disclosure.

Referring now to FIG. 3, a schematic illustration of a portion of a rotor section 300 of a turboprop engine in accordance with an embodiment of the present disclosure is shown. The rotor section 300 may be representative of a portion of a compressor section or a turbine section of the turboprop engine. The rotor section 300 includes a number of rotors having rotor blades 302a-c that extend radially outward from a rotor disk that is rotationally driven on a shaft of the turboprop engine (e.g., compressor section) or rotationally driven by expanding combustion gasses (e.g., turbine section). Arranged in an alternating manner with the rotor blades 302a-c are vanes 304a-c. At an outer diameter of the rotor blades 302a-c are blade shrouds 306a-c that provide a tip clearance 303a-c between the rotor blades 302a-c and an inner surface of the blade shrouds 306a-c. At the outer diameter of the vanes 304a-c are respective vane platforms 308a-c. The tip clearance 303a-c is a gap or space between the outer diameter end of the tips of the rotor blades 302a-c and the inner diameter surface of the blade shrouds 306a-c. In operation, it may be beneficial to have the tips of the rotor blades 302a-c minimally contact or nearly contact the surface of the blade shrouds 306a-c to minimize leakage of flow through the tip clearance 303a-c, whereas full contact may cause grinding, extra friction, and/or damage.

The rotor blades 302 and the vanes 304 are arranged within an engine housing 306. A shroud cooling duct 310 is defined radially between an inner diameter surface of the engine housing 306 and outer diameter surfaces of the blade shrouds 306a-c and outer diameter surfaces of the vane platforms 308a-c. The shroud cooling duct 310 is configured to receive a cooling flow of air from a forward location and the cooling flow will travel in an aftward direction. The shroud cooling duct 310 may be fluidly coupled to one or more ram air scoops located at a forward end of the turboprop engine, such as just aft of a propeller (e.g., as shown and described above).

In operation, the tip clearance 303a-c is variable due to thermal impacts to the rotor blades 302a-c and/or to the blade shrouds 306a-c. For example, as a temperature increases during operation, such as with a turbine section, the blade shrouds 306a-c may experience thermal expansion and expand radially outward. As the blade shrouds 306a-c expand radially outward, the tip clearance 303a-c may increase, thus allowing greater amounts of fluid to flow through the tip clearance 303a-c (e.g., leakage) which may result in losses associated with operation of the turboprop engine.

To counteract the thermal expansion of the blade shrouds 306a-c, the cooling flow passed through the shroud cooling duct 310 may cool an outer diameter surface of the blade shrouds 306a-c, thus cooling the blade shrouds 306a-c and minimizing or preventing the thermal expansion and increases in the gap of the tip clearances 303a-c. Further, to prevent bleed of hot gases from entering the shroud cooling duct 310, and thus optimizing the cooling provided thereby, gap insulating features 312 may be provided between the vane platforms 308a-c and the blade shrouds 306a-c. Such gap insulating features 312 may also be configured to prevent excessive cooling of combustion gases through the vanes 304a-c. As shown, the gap insulating features 312 are arranged at the forward end of the blade shrouds 306a-c, although in other configurations, insulating features may be arranged at the aft ends of the blade shrouds 306a-c as well. In some configurations, the gap insulating features 312 may be air gaps between the edges of the vane platforms 308a-c and the blade shrouds 306a-c. In other embodiments, the gap insulating features 312 may be low heat transfer materials, such as, for example and without limitation, low thermal conductivity materials relative to the shroud conductivity can be used. Further, the geometry may also play a role, and as such a c-seal with a small contact area is an option in accordance with some non-limiting embodiments of the present disclosure. Various materials may include, without limitation, vermiculite, ceramics, and other similar materials may also be used. In other embodiments, the gap insulating features 312 may be seals or the like that prevent excess heat from the vane platforms 308a-c from transferring into the material of the blade shrouds 306a-c. That is, the gap insulating features 312 are configured to prevent heat from the vane platforms 308a-c from transferring into the material of the blade shrouds 306a-c.

Furthermore, optional platform insulating features 314a-c may be provided on outer diameter surfaces of the vane platforms 308a-c. That is, platform insulating features 314a-c may be arranged on surfaces of the vane platforms 308a-c. These platform insulating features 314a-c may be coatings or the like applied to the surfaces of the vane platforms 308a-c that are exposed to the cooling duct 310. The platform insulating features 314a-c may be provided to insulate the material of the vane platforms 308a-c from the cooling flow that passes through the cooling duct 310. One purpose of such platform insulating features 314a-c is to reduce the cooling that is applied to the vanes 304a-c and vane platforms 308a-c. Such cooling may reduce the heat picked up by the cooling flow from the blade shrouds 306a-c, and thus reducing such potential heat pick up by insulating the vane platforms 308a-c can increase the heat picked up from the blade shrouds 306a-c and thereby increase the cooling applied thereto.

The cooling air in the shroud cooling duct 310 is a continuous flow of cooling air sourced from a ram air duct. The cooling air will pick up heat from the blade shrouds 306a-c and carry the heat aftward to be dumped out an aft end of the turboprop engine (e.g., at an exhaust nozzle or through an outlet or the like). As such, the temperature of the blade shrouds 306a-c may be maintained at levels to ensure the tip clearance 303a-c is maintained at appropriate gap sizes (e.g., maintaining contact between the tip and the blade shrouds 306a-c or a maximum gap size).

Figure 4:
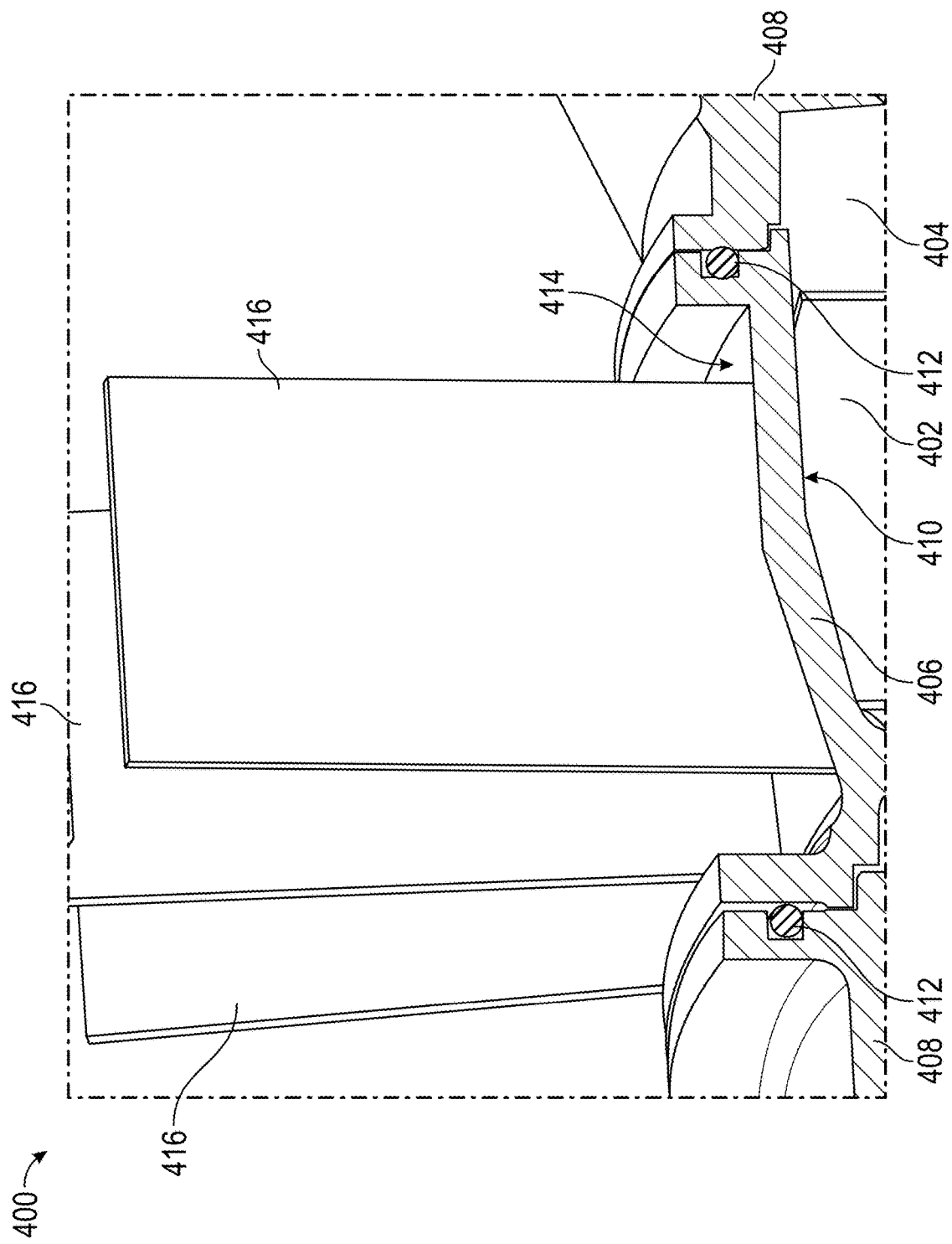
FIG. 4 is a schematic illustration of a portion of a turboprop engine in accordance with an embodiment of the present disclosure.

Referring now to FIG. 4, a schematic illustration of a portion of a rotor section 400 of a turboprop engine in accordance with an embodiment of the present disclosure is shown. The rotor section 400 may be representative of a portion of a compressor section or a turbine section of the turboprop engine. The rotor section 400 includes a number of rotors having rotor blades 402 that extend radially outward from a rotor disk that is rotationally driven on a shaft of the turboprop engine (e.g., compressor section) or rotationally driven by expanding combustion gasses (e.g., turbine section). Arranged in an alternating manner with the rotor blades 402 are vanes 404. At an outer diameter of the rotor blade 402 is a blade shroud 406 that provides a tip clearance between a tip of the rotor blade 402 and an inner surface 410 of the blade shroud 406. At the outer diameter of the vanes 404 are respective vane platforms 408. As discussed above, insulating features 412 may be arranged between the vane platforms 408 and the blade shroud 406.

On an outer diameter surface 414 of the blade shroud 406 may be a plurality of thermal transfer features 416. The thermal transfer features 416 may be mounted to the outer diameter surface 414 of the blade shroud 406 and extend into a shroud cooling duct. As such, a surface area of the blade shrouds 406 may be increased, thus improving a thermal transfer of heat from the blade shrouds 406 to the cooling flow within the shroud cooling duct. The thermal transfer features 416, in this illustrative embodiment, are arranged as fin structures that extend radially outward from the outer diameter surface 414 of the blade shroud 406. Although fin-like structures are illustrative shown, it will be appreciated that other types of structures that may increase a surfaced area of the outer diameter surface 414 of the blade shroud 406 may be employed without departing from the scope of the present disclosure. For example, ridges, undulations, protrusions, wires, tubes, and the like may all be used, individually or in combination, to increase a surface area of the outer diameter surface 414 of the blade shroud 406 that is exposed to the cooling flow within the shroud cooling duct.

Figure 5:
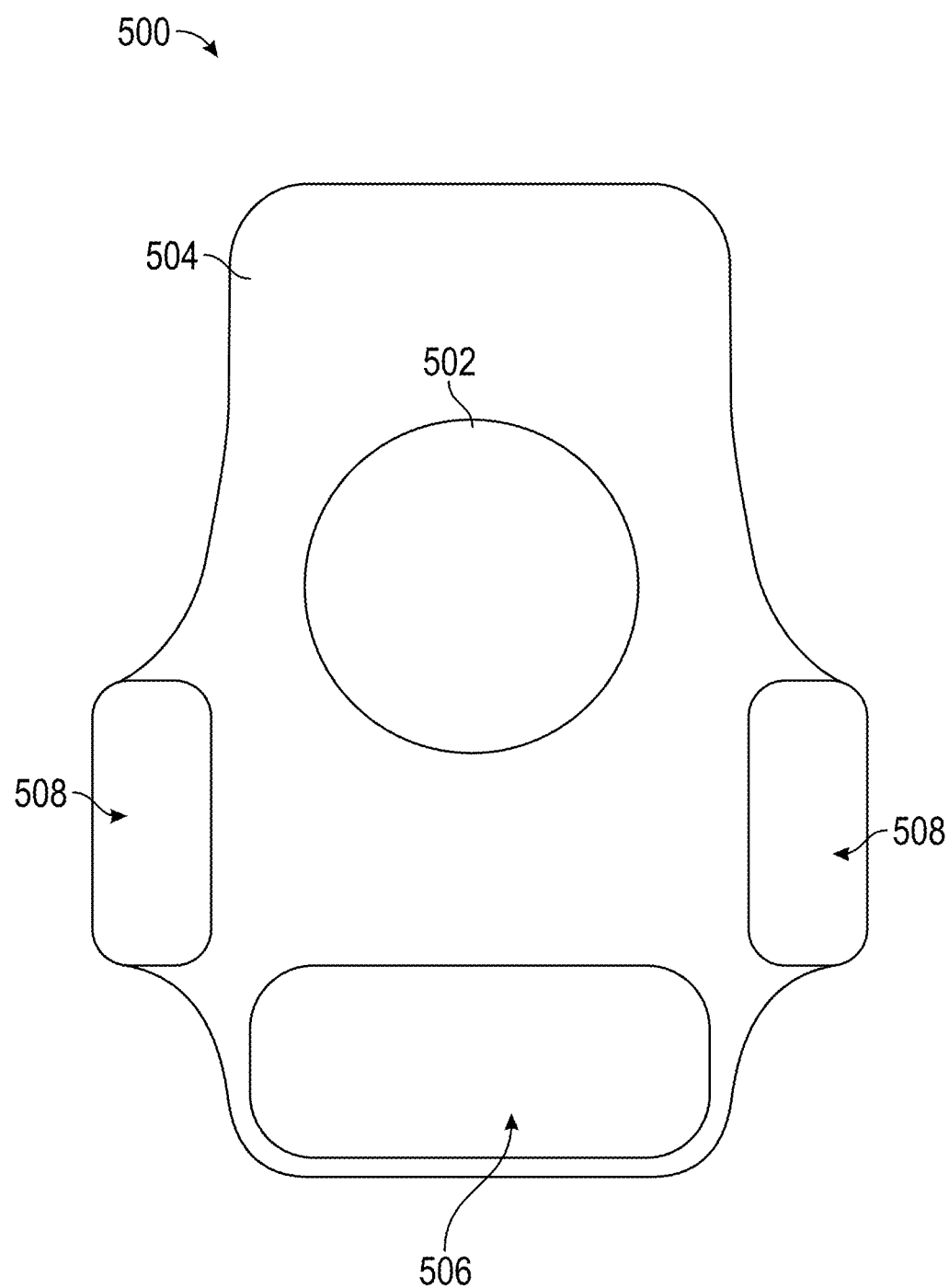
FIG. 5 is a schematic illustration of a portion of a turboprop engine in accordance with an embodiment of the present disclosure.

Referring now to FIG. 5, a schematic illustration of a portion of a turboprop engine 500 in accordance with an embodiment of the present disclosure is shown. The turboprop engine 500 may include various features, including a shroud cooling duct arranged to direct a cooling flow along blade shrouds to provide cooling thereto, as described above. In this illustrative diagram, a propeller 502 (excluding blades thereof) of the turboprop engine 500 and of inlets at the forward end of the turboprop engine 500 are shown. The turboprop engine 500 includes an engine housing 504 that defines an air inlet scoop 506. The air inlet scoop 506 is arranged downstream from the propeller 502 of the turboprop engine 500 and is configured to direct a portion of air from the propeller 502 to the compressor section, so that the air may be compressed and then directed to a combustion section and turbine section, as shown and described above.

The air inlet scoop 506 may be fluidly coupled to the compressor section by a primary duct or the like.

To supply the cooling air into the shroud cooling duct, the turboprop engine 500 is configured with ram air scoops 508 that are arranged aft of the propeller 502 and are configured to receive a portion of the ambient air driven aftward by the propeller 502. A cooling flow of the air will then flow through the shroud cooling ducts and provide cooling to the turbine shrouds, as described above. In this illustrative configuration, the shroud cooling duct is configured with dedicated or discrete ram air scoops 508. The size of the ram air scoops 508 may be defined to provide a maximum required volume or flow rate of cooling flow through the shroud cooling duct. Multiple ram air scoops 508 may be provided to ensure an even distribution of the cooling flow through the shroud cooling duct(s).

In other embodiments, the ram air scoops 508 may not be present, but the air inlet scoop 506 may be increased in size such that a greater volume of air is scooped into the primary duct. The primary duct, in such embodiments, may include one or more junctions where a portion of the air flowing through the air inlet scoop 506 is directed into the shroud cooling duct(s). For example, referring back to FIG. 1, rather than using the ram air scoops 128, the air inlet scoop 118 may be oversized to accommodate additional flow directed into the shroud cooling ducts 126. FIG. 1 illustrates such a split connection 150 shown in dashed lines between the primary duct 120 and the shroud cooling ducts 126. In such a configuration, the ram air scoops 128 may be eliminated entirely.

In still further embodiments, a combination of discrete ram air scoops 508 and an enlarged air inlet scoop 506 may be employed. The increase in size of the air inlet scoop 506 may be sufficient to supply both the necessary air for combustion and other onboard uses and for supplying the cooling flow into the shroud cooling duct(s). Referring again to FIG. 1, in such a configuration, both the ram air scoops 128 and the air inlet scoop 118 may be present, and the split connection 150 may be provided to augment or increase an amount of flow directed into the shroud cooling ducts 126. In some such embodiments, the split connection 150 may be selectively openable based on required throughflow and cooling requirements to ensure a desired tip clearance is maintained.

Figure 6A:
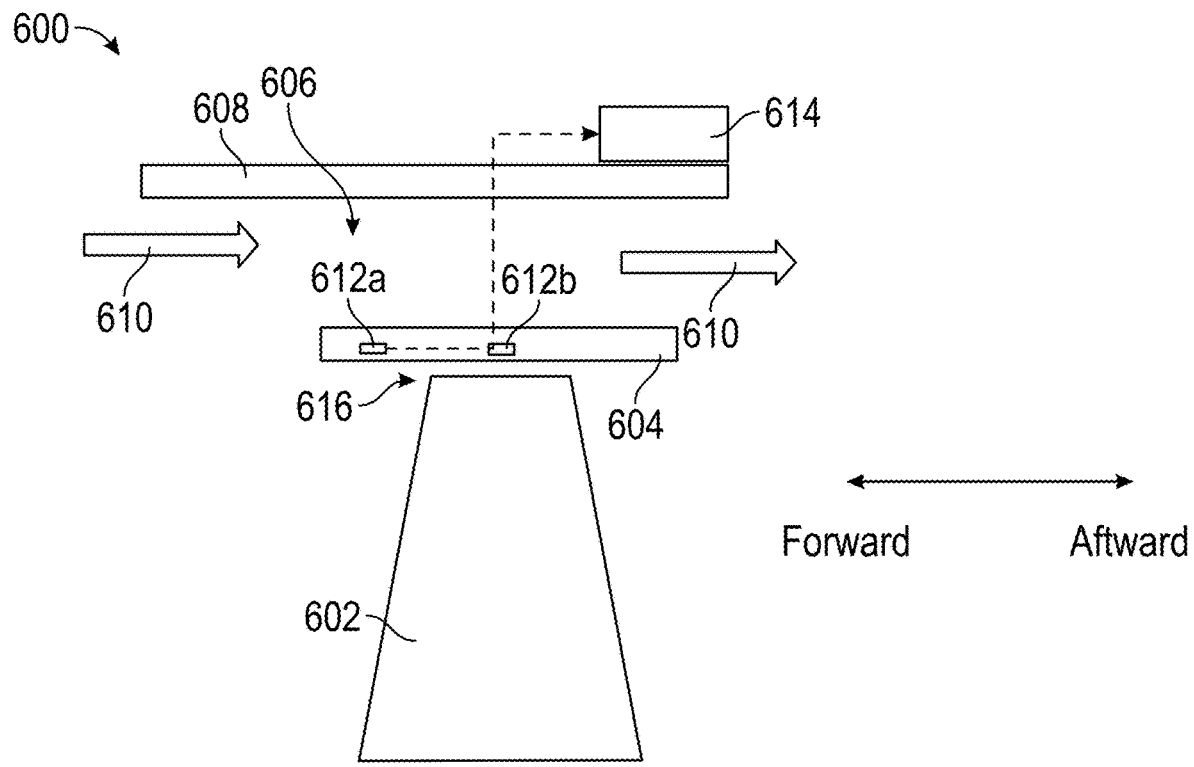
FIG. 6A is a schematic diagram of a portion of a turboprop engine in accordance with an embodiment of the present disclosure.
Figure 6B:
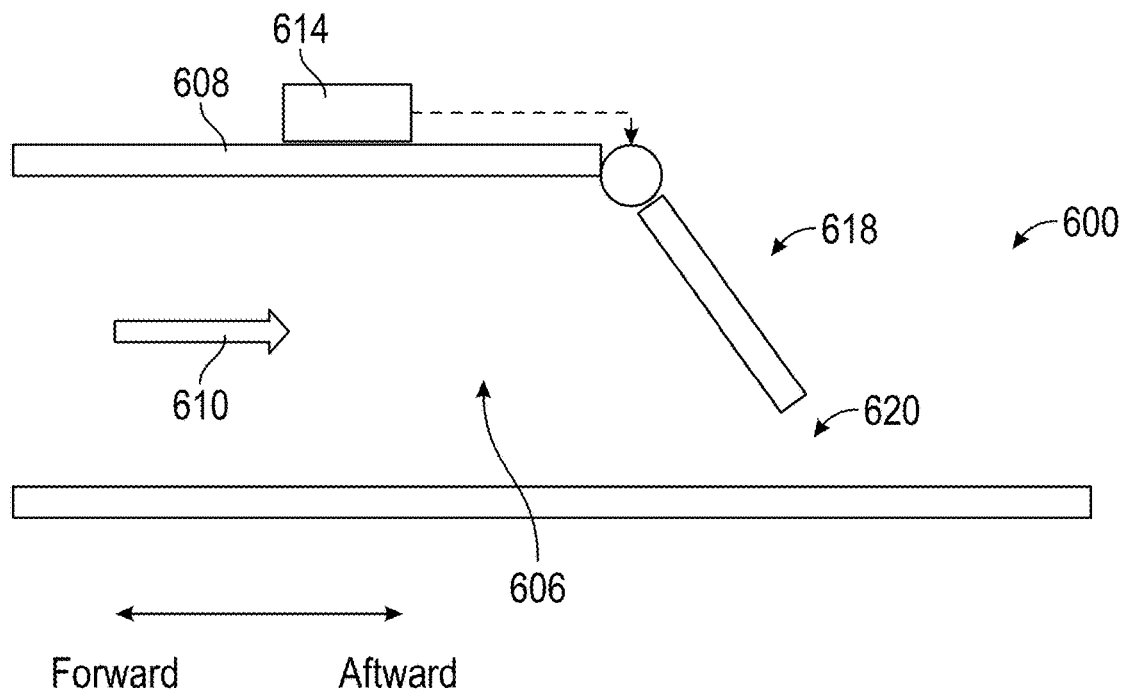
FIG. 6B is a schematic illustration of another portion of the turboprop engine of FIG. 6A.

Referring now to FIGS. 6A-6B, schematic illustrations of portions of a turboprop engine 600 in accordance with an embodiment of the present disclosure are shown. FIG. 6A illustrates a schematic diagram of a rotor blade 602 arranged relative to a blade shroud 604 and a shroud cooling duct 606, such as shown and described above, and FIG. 6B illustrates an aft end of the shroud cooling duct 606. As shown in FIG. 6A, the rotor blade 602 is positioned relative to the blade shroud 604 and the shroud cooling duct 606 is arranged radially outward from the blade shroud 604. The shroud cooling duct 606 is defined between the blade shroud 604 and a housing 608 of the turboprop engine 600. A shroud cooling flow 610 flows in an aftward direction through the shroud cooling duct 606.

The amount of the shroud cooling flow 610 within the shroud cooling duct 606 may be controlled, in part, by the size and arrangement of the ram air scoops (or enlarged air inlet scoop) at the forward end. However, the throughflow may be further controlled through various mechanisms. For example, in this illustrative configuration, the blade shroud 604 may include one or more sensors 612a, 612b that may be operably coupled to a controller 614. In some embodiments, one of the sensors 612a may be temperature sensor (e.g., thermocouple, infrared sensor, or the like) that is embedded within or mounted to the blade shroud 604. As such, a temperature of the blade shroud 604 (e.g., metal temperature) may be directly monitored. The temperature information may be transmitted to the controller 614 to enable further action to be taken. Another type of sensor that may be employed in accordance with embodiments of the present disclosure may be a tip clearance sensor 612b. The tip clearance sensor 612b may be embedded into or mounted to the blade shroud 604 or arranged to monitor and measure the tip clearance 616. The tip clearance information obtained by the tip clearance sensor 612b may be transmitted to the controller 614 to enable further action to be taken.

The controller 614 may be configured to receive information or data from one or more sensors arranged to monitor the tip clearance 616 directly (e.g., tip clearance sensor 612b) or indirectly (e.g., temperature sensor 612a). Based on this information, the controller 614 may be configured to control a flow control assembly 618 (shown in FIG. 6B). The flow control assembly 618 may be a movable baffle, a gate valve, a controllable or movable vane, or the like. The controller 614 may be configured to control the size of an outlet 620 of the shroud cooling duct 606 and thus control and/or regulate the throughflow of the shroud cooling flow 610. By increasing or decreasing the size of the outlet 620, by controlling the flow control assembly 618, the amount of heat removal at the blade shroud 604 may be controlled/regulated, and thus action may be taken in response to increased temperatures and/or tip clearance to avoid excessive tip clearance 616 from being formed. For example, if the tip clearance 616 is too high, the controller 614 may increase the size of the outlet 620 (e.g., open the flow control assembly 618), to achieve a higher flow rate of the shroud cooling flow 610 through the shroud cooling duct 606.

In accordance with some embodiments, the controller 614 may be configured to maintain the tip clearance 616 at or below a maximum tip clearance size or distance. To achieve this, the controller 614 may be configured to increase a flow through the shroud cooling duct and thus increase a cooling of the blade shroud 604, which in turn will radially shrink the blade shroud 604 and decrease or otherwise control the size of the tip clearance 616.

Although the flow control assembly 618 is illustratively shown at an aft end of the shroud cooling duct 606, such a position is not to be limiting. For example, the position of the flow control assembly (or additional flow control assemblies) may be placed at any axial position along the shroud cooling duct and/or within the inlet scoop associated therewith.

Advantageously, embodiments described herein provide for turboprop engines having improved tip clearance control for rotor blades of the turboprop engine. In accordance with embodiments of the present disclosure, a shroud cooling flow is collected by an air inlet (e.g., air inlet scoop or ram air scoop) and directed through a shroud cooling duct that provides cooling or heat removal from blade shrouds of the turboprop engine. In accordance with some embodiments, cooling air from the air inlet scoops is routed into the shroud cooling duct and heat is drawn from blade shrouds. In some configurations, the blade shrouds may be insulated from adjacent vane platforms using one or more insulating features. As such, advantageously, excess heat from the vanes may be prevented from being transferred to the blade shrouds. The heat loss achieved by the shroud cooling flow may cause an average blade shroud temperature to drop. The temperature drop causes the blade shroud to radially shrink, which reduces the tip clearance between the blade tips and the blade shrouds. Advantageously, the lower tip clearance will reduce tip leakage and improve performance. The shroud cooling flow may then be dumped into the airstream out the back of the turboprop engine. Further, advantageously, in accordance with some embodiment, a flow control assembly (e.g., a baffle or valve) at the outlet of the shroud cooling duct may be provided to control a flow of the shroud cooling flow. Further, thermocouples on the blade shrouds and/or other temperature sensors and/or direct clearance measurement sensors may be used to drive a controller to regulate the amount of shroud cooling flow flowing through the shroud cooling duct and thus control the rotor blade tip clearance. Further, advantageously, in some embodiments, thermal transfer features may be mounted to the outer diameter surface of the blade shrouds and extend into the shroud cooling duct, thus increasing the thermal pickup provided by the shroud cooling flow.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A turboprop engine comprising:
   a housing;
   a propeller arranged at a forward end of the housing;
   a rotor assembly arranged within the housing, the rotor assembly comprising at least one rotor having a plurality of rotor blades;
   a blade shroud arranged radially outward from the rotor assembly and positioned relative to the rotor blades such that a tip clearance is defined between tips of the rotor blades and an inner diameter surface of the blade shroud;
   a vane assembly arranged axially adjacent the rotor assembly, wherein the vane assembly comprises a vane platform arranged axially adjacent the blade shroud;
   a shroud cooling duct having a radially inward surface defined by outer diameter surfaces of the blade shroud and the vane platform and a radially outward surface defined by an inner diameter surface of the housing; and
   a ram air scoop configured to direct a shroud ram air cooling flow into the shroud cooling duct to pick up heat from the blade shroud and provide cooling thereto.

2. The turboprop engine of claim 1, further comprising:
   a compressor section;
   a combustor section;
   a turbine section; and
   a shaft, wherein the compressor section, the combustor section, and the turbine section are arranged axially along the shaft.

3. The turboprop engine of claim 2, further comprising an air inlet scoop configured to direct a first portion of air from the propeller to the compressor and the ram air scoop is configured to direct a second portion of air from the propeller to the shroud cooling duct.

4. The turboprop engine of claim 3, wherein the ram air scoop is defined by two separate inlets arranged separate from the air inlet scoop.

5. The turboprop engine of the claim 1, wherein the blade shroud comprises at least one thermal transfer feature arranged on the outer diameter surface thereof, wherein the at least one thermal transfer feature increases a surface area of the blade shroud exposed to the shroud ram air cooling flow within the shroud cooling duct.

6. The turboprop engine of claim 5, wherein the at least one thermal transfer feature comprises a fin.

7. The turboprop engine of claim 1, further comprising a gap insulating feature arranged axially between the vane platform and the blade shroud.

8. The turboprop engine of claim 7, wherein the gap insulating feature is an air gap.

9. The turboprop engine of claim 7, wherein the gap insulating feature is a seal.

10. The turboprop engine of claim 7, wherein the gap insulating feature is formed from a low heat transfer material.

11. The turboprop engine of claim 1, further comprising a platform insulating feature arranged on the outer diameter surface of the vane platform exposed to the shroud cooling duct.

12. The turboprop engine of claim 1, further comprising:
   a flow control assembly configured to control a flow of the shroud ram air cooling flow through the shroud cooling duct.

13. The turboprop engine of claim 12, further comprising:
   a controller configured to control operation of the flow control assembly in response to a measurement of the tip clearance and maintain the tip clearance at or below a maximum tip clearance size.

14. The turboprop engine of claim 13, further comprising at least one sensor configured to monitor the tip clearance, the controller configured to receive data obtained by the at least one sensor.

15. The turboprop engine of claim 14, wherein the at least one sensor comprises at least one of a temperature sensor and a tip clearance sensor.

16. The turboprop engine of claim 12, wherein the flow control assembly is at least one of a movable baffle, a gate valve, and a controllable or movable vane.

17. The turboprop engine of claim 1, wherein the rotor assembly is a rotor assembly of a turbine section of the turboprop engine.

18. The turboprop engine of claim 1, wherein the rotor assembly is a rotor assembly of a compressor section of the turboprop engine.

\* \* \* \* \*